(12) United States Patent
Ishii

(10) Patent No.: US 9,679,386 B2
(45) Date of Patent: Jun. 13, 2017

(54) IMAGE PROCESSING DEVICE CAPABLE OF SEGMENTING AN IMAGE INTO PLURAL AREAS

(71) Applicant: CASIO COMPUTER CO., LTD., Shibuya-ku (JP)

(72) Inventor: Katsunori Ishii, Fussa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 288 days.

(21) Appl. No.: 14/509,779

(22) Filed: Oct. 8, 2014

(65) Prior Publication Data
US 2015/0098648 A1    Apr. 9, 2015

(30) Foreign Application Priority Data

Oct. 9, 2013  (JP) .................................. 2013-211726

(51) Int. Cl.
*G06T 7/00*  (2017.01)
*G06T 7/11*  (2017.01)
(Continued)

(52) U.S. Cl.
CPC ............. *G06T 7/0081* (2013.01); *G06T 7/11* (2017.01); *G06T 7/136* (2017.01); *G06T 7/162* (2017.01);
(Continued)

(58) Field of Classification Search
USPC ........................................ 382/164, 171, 173
See application file for complete search history.

(56) References Cited

U.S. PATENT DOCUMENTS

| | | | | |
|---|---|---|---|---|
| 5,889,882 A | * | 3/1999 | Senn ..................... | G06T 7/0012 378/62 |
| 8,594,423 B1 | * | 11/2013 | Carpenter ............. | G06T 7/0081 358/453 |

(Continued)

FOREIGN PATENT DOCUMENTS

| | | |
|---|---|---|
| CN | 101479762 | 7/2009 |
| CN | 102216956 | 10/2011 |

(Continued)

OTHER PUBLICATIONS

Murao, T. et al. "Object Extraction Based on Bag-of-Keypoints Image Categorization", Proceedings of the 2009 IEICE General Conference, Information and System 2, Japan, Incorporated Association of The Institute of Electronics, Information and Communication Engineers (IEICE), Mar. 4, 2009, p. 205.

(Continued)

*Primary Examiner* — Ishrat I Sherali
(74) *Attorney, Agent, or Firm* — Cozen O'Connor

(57) ABSTRACT

An image processing device of the present invention determines the pixel values of background pixels based on a pixel value histogram of a target image to be segmented into a foreground and a background, determines pixels of the target image having pixel values equivalent to the pixel values of these background pixels, as a portion of the background pixels, and determines other background pixels and foreground pixels in the target image by use of the pixel value of each pixel in the target image and the positional information of this portion of the background pixels.

23 Claims, 10 Drawing Sheets

(51) Int. Cl.
  *G06T 7/162* (2017.01)
  *G06T 7/194* (2017.01)
  *G06T 7/136* (2017.01)

(52) U.S. Cl.
  CPC .... *G06T 7/194* (2017.01); *G06T 2207/10024* (2013.01)

(56) References Cited

U.S. PATENT DOCUMENTS

| | | |
|---|---|---|
| 8,861,854 B2 | 10/2014 | Shimazaki |
| 2013/0230237 A1 | 9/2013 | Schlosser et al. |
| 2013/0243321 A1 | 9/2013 | Shimazaki |

FOREIGN PATENT DOCUMENTS

| | | |
|---|---|---|
| CN | 102490646 | 6/2012 |
| CN | 102542544 | 7/2012 |
| CN | 103324927 | 9/2013 |
| JP | 2000-251079 | 9/2000 |
| JP | 2002-209082 | 7/2002 |
| JP | 2004-252748 | 9/2004 |
| JP | 2010-205067 | 9/2010 |
| JP | 2013120498 A * | 12/2011 ............... G06T 7/00 |
| JP | 2012-033052 | 2/2012 |
| JP | 2013-029930 | 2/2013 |
| JP | 2013-511076 | 3/2013 |
| JP | 2013-120498 | 6/2013 |

OTHER PUBLICATIONS

Matsuo, K. "A Non-Interactive Image Segmentation Method Based on the Shape Similarity of the Grabcut", Study Report of Information Processing Society of Japan: Computer Vision and Image Medica (CVIM), Japan, Incorporated Association of Information Processing Society of Japan, Apr. 15, 2010, vol. 2010-CVIM-171, No. 19, pp. 1-8.

Kayama, Y. et al. "Silhouette Extraction Based on Time Sequence Histograms and Graph Cut for Golf Swing Diagnosis", IEEJ Special Issue Paper C, Japan, General Incorporated Association of The Institute of Electrical Engineers of Japan (IEEJ), Nov. 1, 2012, vol. 132, No. 11, pp. 1840-1846.

Office Action dated Apr. 1, 2017 which issued in the corresponding Chinese Patent Application No. 201410667836.7.

* cited by examiner

ORIGINAL IMAGE

| 1 | 2 | 3 | 4 |
|---|---|---|---|
| 5 | 6 | 7 | 8 |
| 9 | 10 | 11 | 12 |
| 13 | 14 | 15 | 16 |

ORIGINAL IMAGE

FIG. 7

| GROUP NUMBER | LUMINANCE VALUE RANGE | |
|---|---|---|
| | MINIMUM IN RANGE | MAXIMUM IN RANGE |
| 0 | 0 | 7 |
| 1 | 8 | 15 |
| 2 | 16 | 23 |
| 3 | 24 | 31 |
| 4 | 32 | 39 |
| 5 | 40 | 47 |
| 6 | 48 | 55 |
| 7 | 56 | 63 |
| 8 | 64 | 71 |
| 9 | 72 | 79 |
| 10 | 80 | 87 |
| 11 | 88 | 95 |
| 12 | 96 | 103 |
| 13 | 104 | 111 |
| 14 | 112 | 119 |
| 15 | 120 | 127 |
| 16 | 128 | 135 |
| 17 | 136 | 143 |
| 18 | 144 | 151 |
| 19 | 152 | 159 |
| 20 | 160 | 167 |
| 21 | 168 | 175 |
| 22 | 176 | 183 |
| 23 | 184 | 191 |
| 24 | 192 | 199 |
| 25 | 200 | 207 |
| 26 | 208 | 215 |
| 27 | 216 | 223 |
| 28 | 224 | 231 |
| 29 | 232 | 239 |
| 30 | 240 | 247 |
| 31 | 248 | 255 |

IMAGE AFTER PIXELS HAVING LUMINANCE
VALUES NEAR PEAKS IN DISTRIBUTION ARE
DESIGNATED AS BACKGROUND

GRAY

BLACK AREAS ARE AREAS DESIGNATED
AS BACKGROUND (GRAY AREAS AND
WHITE AREAS ARE AREAS THAT HAVE
NOT BEEN DESIGNATED AS BACKGROUND)

IMAGE PROCESSING DEVICE CAPABLE OF SEGMENTING AN IMAGE INTO PLURAL AREAS

CROSS-REFERENCE TO RELATED APPLICATION

This application is based upon and claims the benefit of priority from the prior Japanese Patent Application No. 2013-211726, filed Oct. 9, 2013, the entire contents of which are incorporated herein by reference.

BACKGROUND OF THE INVENTION

1. Field of the Invention

The present invention relates to an image processing device which performs processing for segmenting an image into a plurality of areas.

2. Description of the Related Art

A technique in which an area desired by a user (for example, an area corresponding to a handwritten drawing on a piece of paper shown in a captured image) is extracted from an image is known to the public. However, in some cases, the area of an image cannot be appropriately segmented with this technique due to luminance difference, brightness unevenness, and reflection over the whole image. As this type of technique for extracting an area, a technique called image segmentation is known, and there are various methods for this segmentation processing, such as Grab Cut. However, these methods are based on an assumption that an area to be extracted is specified, and therefore have a problem in that an area to be extracted is difficult to be precisely specified, and an incorrect specifying operation may create an adverse result in segmentation processing.

For this reason, there is a conventional technique in which, when a point in an extraction target area (photographic subject) in a displayed image is tapped (specified by a user), an area of a predetermined shape (such as a circular shape) including a coordinate point corresponding to the tapped point is created in the image, and the pixels of the image are segmented into background pixels and foreground pixels and the foreground portion is extracted by segmentation processing being performed with the created area as an initial area for the foreground by the use of a program of Grab Cut (refer to Japanese Patent Application Laid-Open (Kokai) Publication No. 2013-029930).

With this technique, segmentation processing can be performed simply by a portion of an extraction target being specified by a tap operation, which significantly reduces burden placed on the user. However, in a case where the extraction target has a complicated shape, it may not be entirely included in the above-described predetermined-shaped area (for example, a circular-shaped area), which may create an adverse result in the processing for segmenting the pixels of the image into background pixels and foreground pixels.

An object of the present invention is to enable an area in an image to be precisely cut out therefrom without a user's auxiliary operation for specifying the area.

SUMMARY OF THE INVENTION

In accordance with one aspect of the present invention, there is provided an image processing device comprising: a pixel value determining section which determines pixel values of background pixels based on a pixel value histogram of a target image to be segmented into a foreground and a background; a first determination section which determines pixels of the target image having pixel values equivalent to the pixel values of the background pixels, as a portion of the background pixels; and a second determination section which determines other background pixels and foreground pixels in the target image by use of a pixel value of each pixel in the target image and positional information of the portion of the background pixels.

In accordance with another aspect of the present invention, there is provided an image processing method comprising: a step of determining pixel values of background pixels based on a pixel value histogram of a target image to be segmented into a foreground and a background; a step of determining pixels of the target image having pixel values equivalent to the pixel values of the background pixels, as a portion of the background pixels; and a step of determining other background pixels and foreground pixels in the target image by use of a pixel value of each pixel in the target image and positional information of the portion of the background pixels.

In accordance with another aspect of the present invention, there is provided a non-transitory computer-readable storage medium having stored thereon a program that is executable by a computer of an image processing device, the program being executable by the computer to perform functions comprising: processing for determining pixel values of background pixels based on a pixel value histogram of a target image to be segmented into a foreground and a background; processing for determining pixels of the target image having pixel values equivalent to the pixel values of the background pixels, as a portion of the background pixels; and processing for determining other background pixels and foreground pixels in the target image by use of a pixel value of each pixel in the target image and positional information of the portion of the background pixels.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

BRIEF DESCRIPTION OF THE DRAWINGS

FIG. 7 is a diagram showing a list where luminance values have been grouped and the numbers of luminance values in each group have been counted;

DETAILED DESCRIPTION OF THE PREFERRED EMBODIMENTS

Hereinafter, an embodiment of the present invention will be described with reference to FIG. 1 to FIG. 10.

Figure 1:
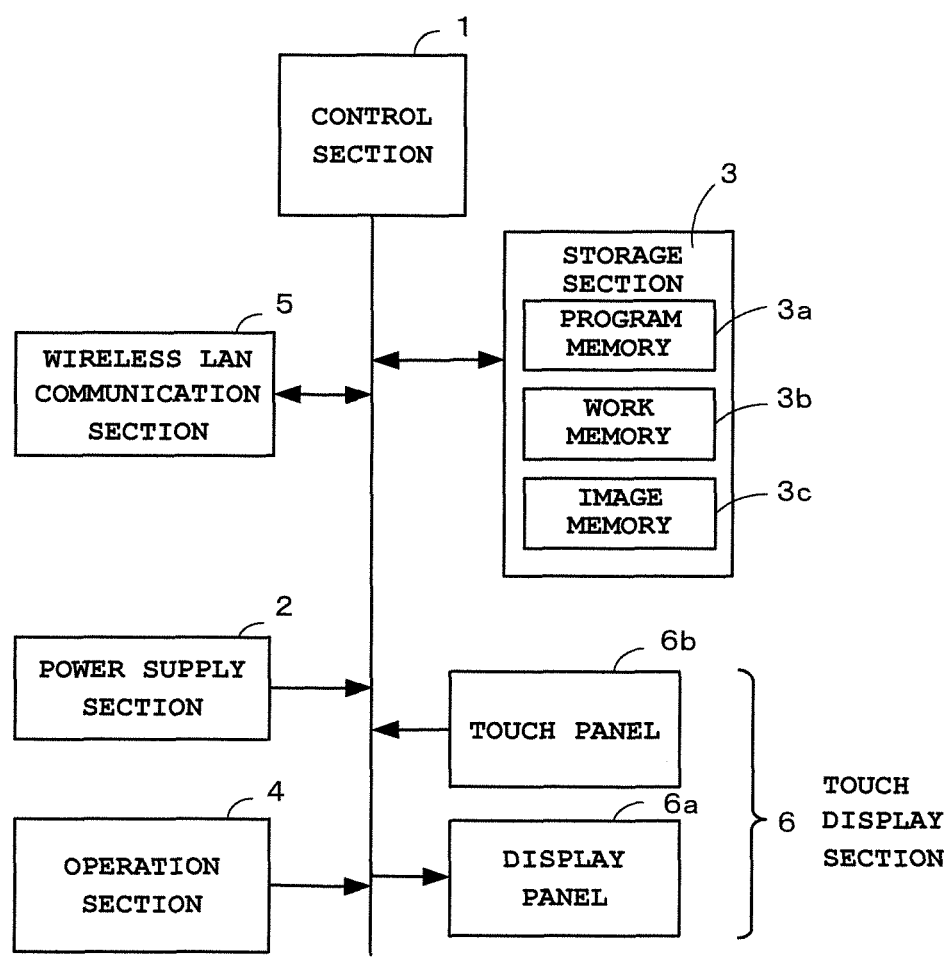
FIG. 1 is a block diagram showing basic components of a tablet terminal device in which the present invention has been applied as an image processing device.

In this embodiment, the present invention has been applied in a tablet terminal device as an image processing device, and FIG. 1 is a block diagram showing basic components of this tablet terminal device.

This tablet terminal device is a portable information terminal device whose housing is of A5 size as a whole, and has a touch input function, a wireless communication function, an Internet connecting function, etc. A control section 1 that serves as the core of this tablet terminal device operates by receiving power from a power supply section (secondary battery) 2. This control section 1 includes a central processing unit that controls the entire operation of the tablet terminal device according to various programs in a storage section 3, a memory, etc.

Figure 3:
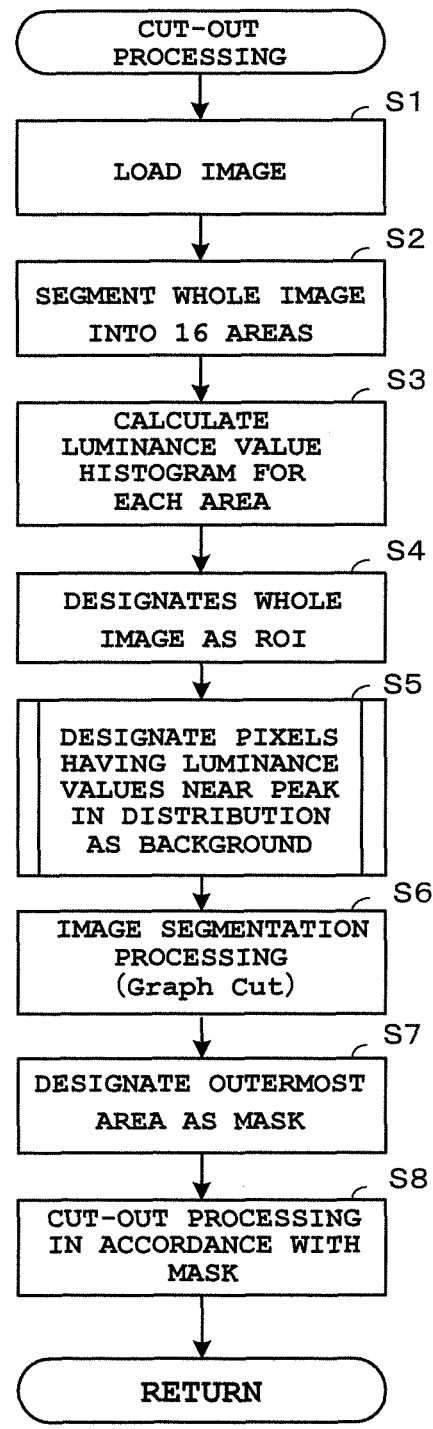
FIG. 3 is a flowchart of processing for cutting out a handwritten drawing on a piece of white paper shown in a captured image.
Figure 4:
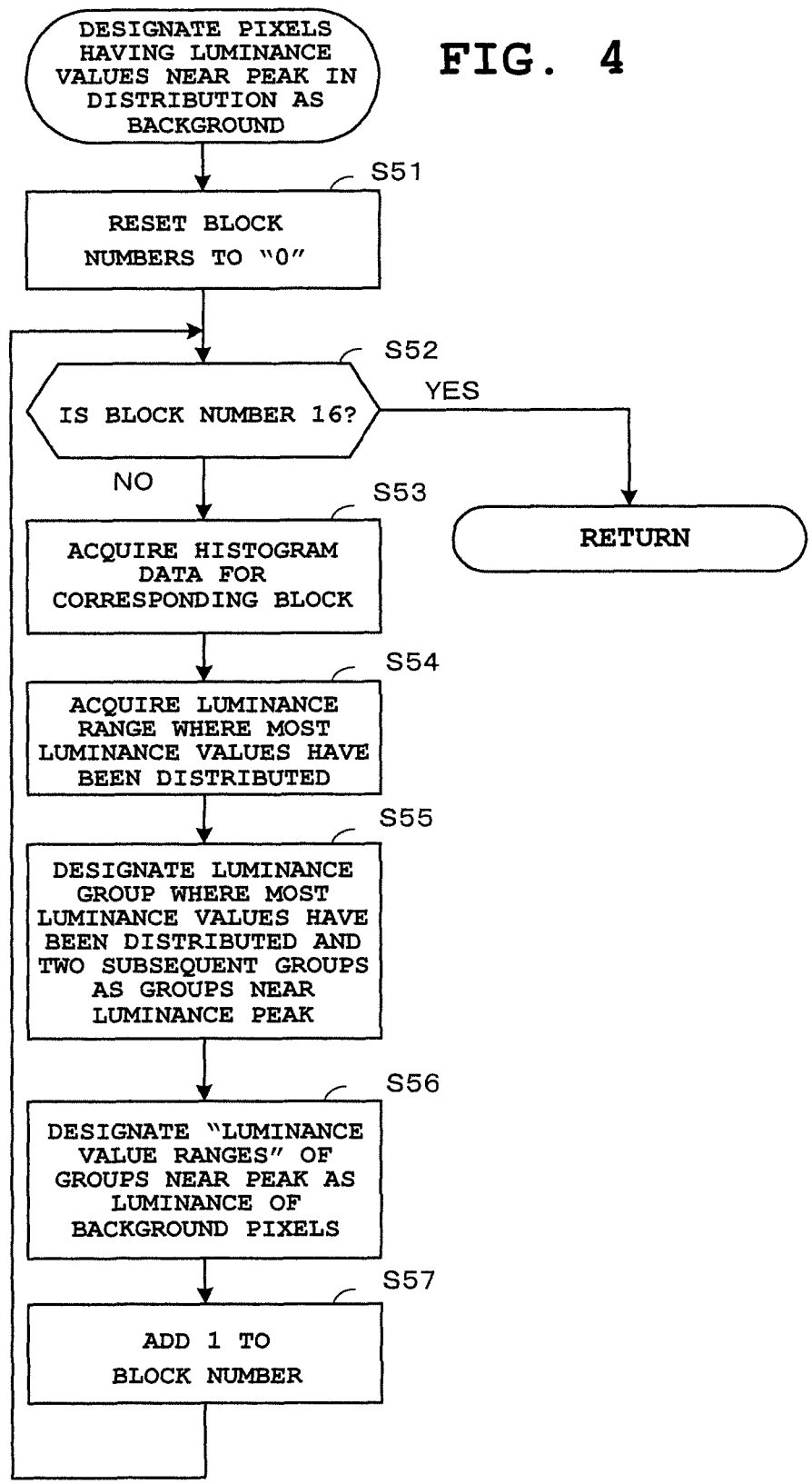
FIG. 4 is a flowchart of operations following those in FIG. 3.

The storage section 3 is structured to include a ROM (Read-Only Memory), a flash memory, and the like, and has a program memory 3a having stored therein programs for achieving the present embodiment according to operation procedures shown in FIG. 3 and FIG. 4, a work memory 3b that temporarily stores various data and flags required in this tablet terminal device, and an image memory 3c that stores various image data such as a moving image captured by a camera function. Note that the storage section 3 may be structured to include, for example, a removable portable memory (recording medium) such as an SD (Secure Digital) card or IC (Integrated Circuit) card. In addition, although not shown, the storage section 3 may include a storage area on a predetermined server device side in a case where the tablet terminal device is connected to a network via a communication function. Also, the image memory 3c is not limited to an internal memory and may be a removable portable memory such as an SD card. This memory 3c stores, for example, image data received and acquired via the Internet or image data captured by a camera device (not shown).

An operation section 4 in FIG. 1 includes a power supply key for turning power supply ON/OFF, a selection key for selecting a moving image to be processed, and the like not shown, as push-button-type keys. A wireless LAN (Local Area Network) communication section 5 in FIG. 1 is a wireless communication module capable of high-speed large-capacity communication, and is connectable to the Internet or the like via a wireless LAN router nearby (omitted in the drawing). A touch display section 6 in FIG. 1 is structured by a touch panel 6b being laminated on a display panel 6a, and displays function names serving as software keys (soft keys), various icons, and image data. The touch panel 6b of the touch display section 6 constitutes a touch screen which detects a point where a touch operation has been performed with a finger or the like (including an operator such as a pen) and inputs coordinate data of the point. Note that, although a capacitive type or a resistive film type is adopted in this embodiment, another type such as a photosensor type may be adopted.

Figures 2A, 2B:
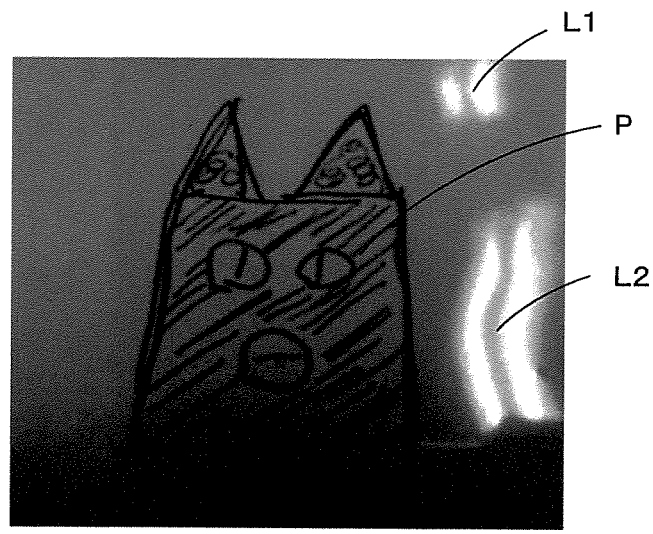
FIG. 2A is a diagram exemplarily showing image data (original image) read out as a processing target from an image memory 3c.
FIG. 2B is a diagram showing a state where the original image has been segmented into a plurality of areas (16 areas)

FIG. 2A is a diagram exemplarily showing image data (original image) read out as a processing target from the image memory 3c.

The original image shown in FIG. 2A is a captured image showing a drawing P (the face of an ogre drawn with a black line) handwritten on substantially the center of a piece of white paper or a white board by use of a black pen. In FIG. 2A, luminance difference and brightness unevenness have occurred over the whole image due to reflection at the time of the image capturing, and fluorescent lights on the ceiling are being reflected on a center portion on the right side, whereby the lower half of the image is dark and the upper half of the image is bright.

L1 and L2 in FIG. 2A indicate areas where the fluorescent lights are being reflected, and therefore are especially bright. In this embodiment, areas with high brightness are designated as a background from the whole image so that the drawing P handwritten on the piece of white paper or the white board is cut out from the original image. That is, in a case where the drawing (line drawing portion) P is designated as a foreground for the captured image showing the drawing (line drawing) P drawn using a second color (black) on a drawing medium of a first color (white), areas of a color close to the first color are identified as a background. In this embodiment, before image processing for cutting out the drawing P from the original image, luminance value histograms are generated in which the distribution of the luminance values (luminance levels) of pixels in the image is graphically shown. Then, among the luminance values in the luminance distribution (brightness distribution), not the luminance values of the highest luminance areas (glossy reflection areas that are too bright) but luminance values close to the peak (the most luminance values in the distribution) are designated as the luminance of background pixels, and predetermined image segmentation processing (segmentation processing such as Grab Cut) is performed, whereby the area of the drawing P (the area of the line drawing) desired by the user is cut out from the image.

This image segmentation processing is processing for segmenting the pixels of the whole image into foreground pixels and background pixels based on the positional information of some of the background pixels specified in the image, which is segmentation processing called Grab Cut. Note that the original image herein is not limited to a gray scale image and, as a matter of course, may be a color image. In this case, a configuration may be adopted in which luminance information is generated from R (red), G (green), and B (blue) of the color image so as to acquire luminance value histograms. Also, although the drawing medium in the present embodiment is white paper or a white board, it may be color paper, a blackboard, or the like.

FIG. 2B is a diagram showing a state where the original image has been equally segmented into a plurality of areas, or more specifically, 16 areas in the form of four-by-four matrix.

In the present embodiment, in order to address the problems due to luminance difference and brightness unevenness over the whole original image, this original image is equally segmented into 16 areas (1) to (16); a luminance histogram is generated for each area (1) to (16) by calculation; pixels having luminance values near the peak in the luminance distribution are designated as background pixels; and segmentation processing is performed. Note that the original image is not necessarily required to be segmented into 16 areas, and may be segmented into 8 areas, 32 areas, or the like. That is, the number of these areas and the manner of the division can be arbitrarily determined.

As described above, the image processing device (tablet terminal device) of the present embodiment includes a segmentation processing section (the control section 1, the program memory 3a) which performs predetermined image segmentation processing for segmenting the pixels of a whole image (such as a captured image showing a drawing drawn on a piece of paper) into foreground pixels and background pixels based on the position information of some of the background pixels specified in the image; a specifying section (the control section 1, the program memory 3a) which specifies the luminance of background pixels based on luminance distribution in the image; and a control section (the control section 1, the program memory 3a) which designates pixels having luminance equivalent to the luminance specified by the specifying section as background pixels, and controls the predetermined image segmentation processing (segmentation processing such as Grab Cut) to be performed.

Next, the operation concept of the image processing device (tablet terminal device) of the present embodiment is described with reference to flowcharts shown in FIG. 3 and FIG. 4. Here, each function described in the flowcharts is stored in a readable program code format, and operations based on these program codes are sequentially performed. Also, operations based on the above-described program codes transmitted over a transmission medium such as a network can also be sequentially performed. That is, the unique operations of the present embodiment can be performed using programs and data supplied from an outside source over a transmission medium, in addition to a recording medium. Note that these flowcharts in FIG. 3 and FIG. 4 outline operations of the characteristic portion of the present embodiment from among all of the operations of the image processing device (tablet terminal device). After exiting the flows in FIG. 3 and FIG. 4, the procedure returns to the main flow (not shown) of the overall operation.

FIG. 3 and FIG. 4 are flowcharts of processing for cutting out a handwritten drawing on a piece of white paper shown in a captured image, which is started when cut-out processing is selected using a menu screen by a user operation, or started as part of image processing when a cut out image is combined with another image.

First, the control section 1 loads, as an original image, image data (such as still image data) selected as a processing target from the image memory 3c (Step S1 in FIG. 3). Next, the control section 1 equally segments the whole image into N areas, such as 16 areas, as shown in FIG. 2B (Step S2), and generates a luminance value histogram for each of these areas by calculation (Step S3). Then, the control section 1 designates the whole original image as ROI (Region Of Interest) (Step S4), and designates pixels having luminance values near the peak in the luminance distribution as background pixels (Step S5).

FIG. 4 is a flowchart for explaining in detail the processing for designating pixels having luminance values near the peak in the luminance distribution as background pixels (Step S5 in FIG. 3).

First, the control section 1 resets block numbers to "0" which have been assigned to each area (1) to (16) acquired by the original image being segmented into the 16 areas, in order to sequentially specify the areas from the first one (Step S51). Then, the control section 1 judges whether the current block number is "16", or in other words, judges whether the last area (16) has been specified (Step S52). At first, the current block number is "0" and the first area (1) is specified. Accordingly, the control section 1 acquires histogram data for the corresponding block (area) (Step S53). Hereafter, until the block number "16" is reached, the control section 1 repeatedly performs the processing in Step S52 to Step S57 described below.

FIG. 5 and FIG. 6 are diagrams showing examples of the luminance value histograms.

Figure 5A:
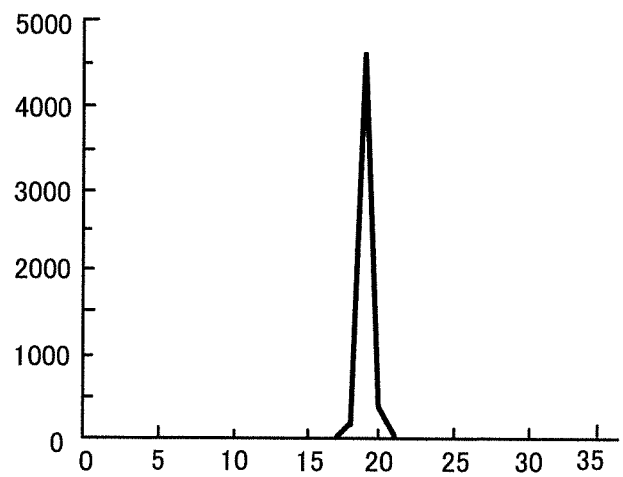
FIG. 5A and FIG. 5B are diagrams showing examples of luminance value histograms.
Figure 5B:
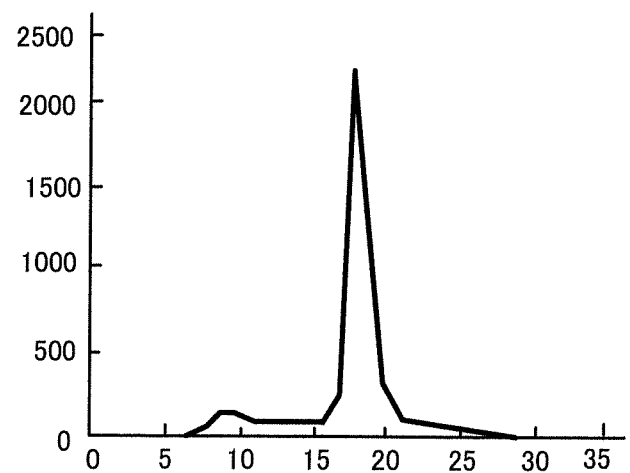
Figure 6A:
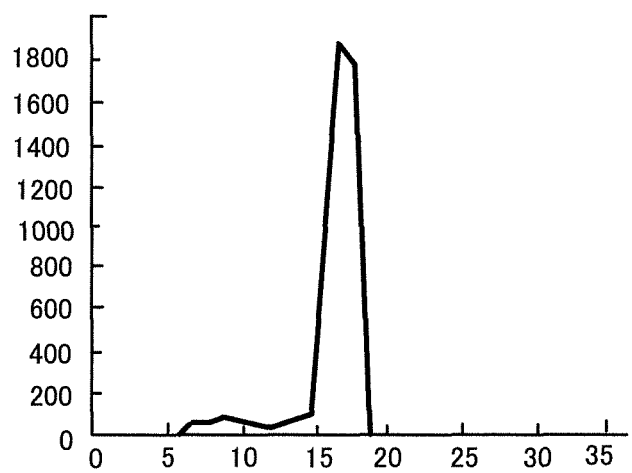
FIG. 6A and FIG. 6B are diagrams showing examples of luminance value histograms different from those of FIG. 5A and FIG. 5B.
Figure 6B:
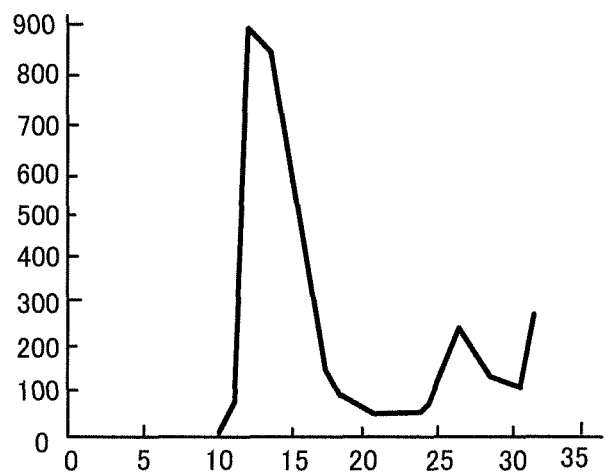

FIG. 5A shows the histogram of area (1) among areas (1) to (16) acquired by the original image being segmented into the 16 areas as shown in FIG. 2B, and FIG. 5B shows the histogram of area (7). Also, FIG. 6A shows the histogram of area (10), and FIG. 6B shows the histogram of area (16). Note that the horizontal axis in each diagram indicates a luminance value, and the vertical axis indicates the number of pixels. In addition, the left-hand side of the diagram indicates dark (black) pixels and the right-hand side indicates bright (white) pixels.

Area (1) is an upper left corner portion including only a blank paper portion or a white board portion, as shown in FIG. 2A and FIG. 2B. Therefore, a peak of luminosity clearly appears in the histogram. Also, area (7) is a right upper portion where the drawing P has been drawn, and the areas L1 and L2 where the fluorescent lights are being reflected are near area (7), because of which the distribution of the luminosity includes luminosity higher than the peak value. Area (10) is a left lower portion where the drawing P has been drawn, which is far from the areas L1 and L2 where the fluorescent lights are being reflected, as compared to area (7). Accordingly, the distribution of the luminosity is narrower than that of area (7). In addition, luminosity lower than the peak value is included due to the effects of black lines within the drawing P. Area (16) is a lower right corner portion. Since a large portion of the area L2 where the fluorescent lights are being reflected is included therein, area (16) has a plurality of luminosity peaks.

FIG. 7 is a diagram showing a list where luminance values have been grouped and the numbers of luminance values in each group have been counted. In the example of this diagram, the luminance values have been grouped into 32 groups, and the "minimum in range" and the "maximum in range" in a "luminance value range" have been associated with each "group number" 0 to 31. Here, Step S53 to Step S57 are described using the histogram of area (10) in FIG. 6A as an example. First, the control section 1 acquires, from the histogram of area (10), the luminance range where the most luminance values have been distributed (Step S54). Here, since the luminance peak in the histogram of FIG. 6A is a luminance value of "16", the luminance range of "group number" 16 is acquired as the luminance range where the most luminance values have been distributed.

Then, the control section 1 designates, as groups near the luminance peak, the luminance group where the most luminance values have been distributed and two subsequent groups (Step S55). That is, group number "16" that is the luminance group where the most luminance values have been distributed, and group number "17" and group number "18" that are the subsequent groups are designated as groups near the luminance peak. Next, the control section 1 designates the "luminance value ranges" of the designated groups near the peak as the luminance of background pixels (Step S56). That is, a "luminance value range" of 128 to 151 for designated group numbers 16 to 18 is designated as the luminance of background pixels. Subsequently, the control section 1 updates the current block number by adding 1 to it (Step S57), and then returns to Step S52. Hereafter, until the block number "16" is reached, the control section 1 repeatedly performs Step S52 to Step S57.

Figure 8A:
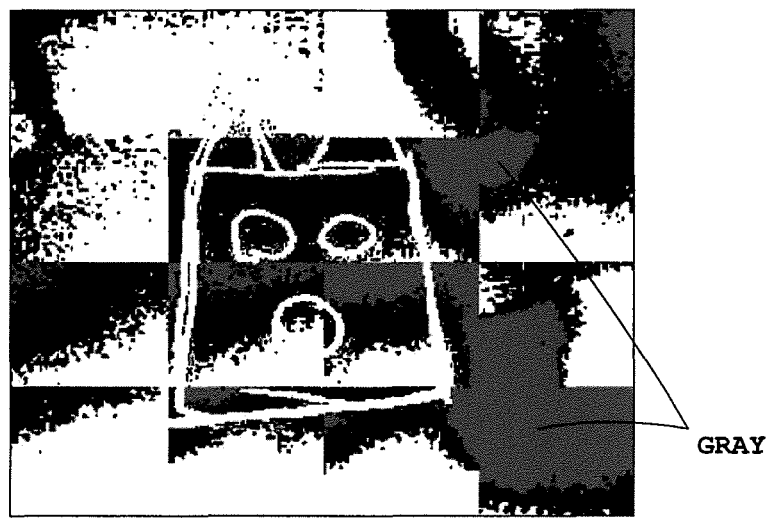
FIG. 8A is a diagram exemplarily showing an image after processing for designating pixels having luminance values near the peak in luminance distribution as background pixels.

FIG. 8A is a diagram exemplarily showing an image after the processing for designating pixels having luminance values near the peaks in the luminance distribution in the original image in FIG. 2A as background pixels.

In this image, the background portions have been shown in black. Portions (gray portions and white portions) other than these black portions are areas which have not been designated as backgrounds (which may be line drawing portions).

Figure 8B:
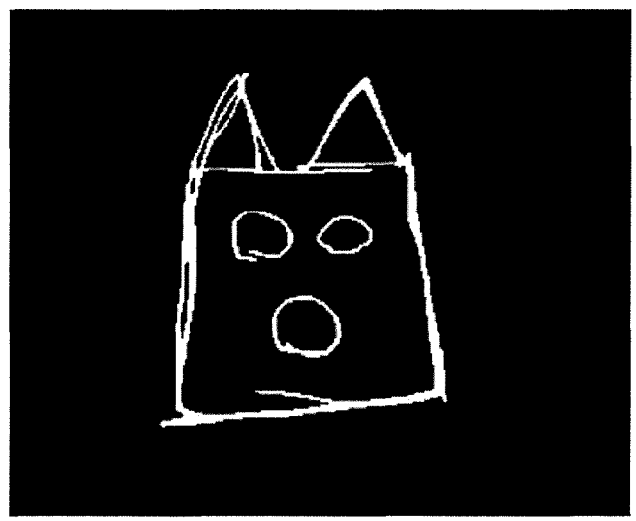
FIG. 8B is a diagram showing a cut-out mask (cutting die) image acquired by image segmentation processing.

After luminance values for background pixels are determined for each area as described above, the control section 1 proceeds to Step S6 in FIG. 3, and performs image segmentation processing (segmentation processing such as Grab Cut) for each area. In this image segmentation processing, the initially designated background pixels are taken as pixels already determined to be backgrounds, and target pixels that remain undetermined as to whether they are foregrounds or backgrounds are determined to be foregrounds or backgrounds such that a total value acquired by luminance differences between adjacent pixels in plural areas of the image being tallied from a predetermined viewpoint is small. As a result of this image segmentation processing, a cut-out mask (cutting die) image shown in FIG. 8B is acquired. In this case, the area of background pixels is present surrounded by the area of foreground pixels constituting the drawing (line drawing portion), and parts drawn within the drawing are also cut out. Accordingly, in the next Step S7, only the outermost area (contour) is used as the cut-out mask image. That is, an area along the outermost contour of the area of the foreground pixels is set as an area to be cut out in the image.

Also, in this image segmentation processing, processing is repeated in which the background pixels and the foreground pixels of the target image to be segmented into a foreground and a background are estimated with a predetermined accuracy by use of the pixel value of each pixel and the positional information of some of the background pixels in the target image, and the background pixels and the foreground pixels of the target image are determined with a higher accuracy by use of the estimation result.

FIG. 9 is a diagram for explaining how the outermost area (contour) is specified.

Figure 9A:
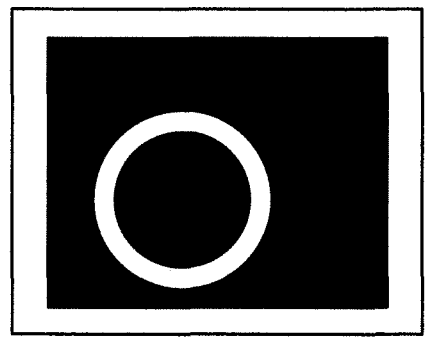
FIG. 9A and FIG. 9B are diagrams for explaining how an outermost area (contour) is specified.
Figure 9B:
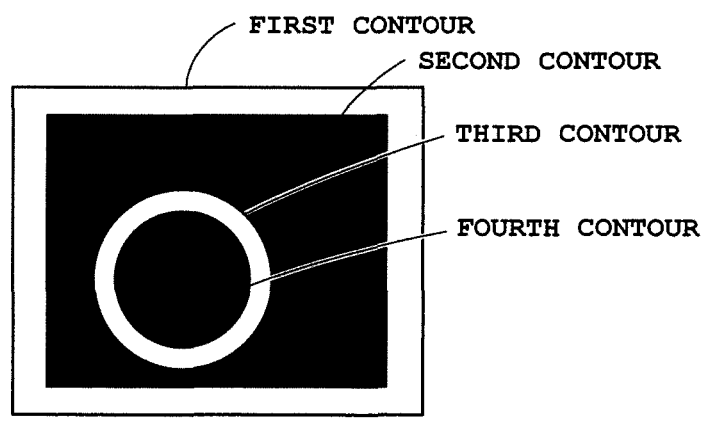

Here, "cvFindContours of openCv (proprietary name)" is used for the counting of areas (contours). FIG. 9A is a diagram depicting an image where a white line drawing on a black base is showing a square and a circle therein, in which four black boundary lines (contour lines), that is, the inner and outer boundary lines (contour lines) of the square, and the inner and outer boundary lines (contour lines) of the circle are included. That is, in this contour structure, a white contour is located in the outermost area, a black contour is located within this white contour, another white contour is located within this black contour, and another black contour is located within this white contour. FIG. 9B is a diagram for explaining how the contours are counted, in which the outer contour line of the square indicates a first contour (white contour), the inner contour line of the square indicates a second contour (black contour), the outer contour line of the circle indicates a third contour (white contour), and the inner contour line of the circle indicates a fourth contour (black contour). Among these contours, only the first contour indicated by the outer contour line of the square remains so that it is identified as the outermost area (contour).

Figure 10A:
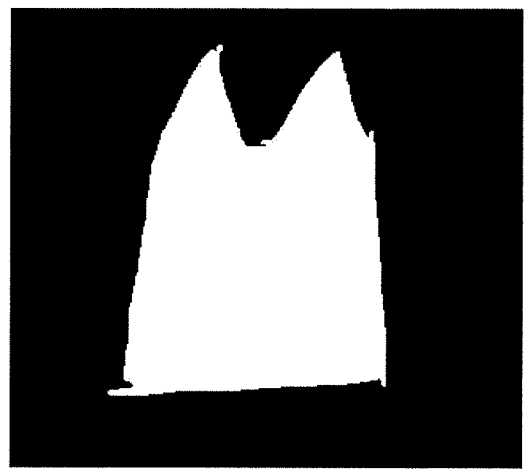
FIG. 10A is a diagram exemplarily showing a case where only an outermost area (contour) has been adopted as a cut-out mask image.

FIG. 10A is a diagram exemplarily showing a case where only the outermost area (contour) has been adopted as the cut-out mask image.

Figure 10B:
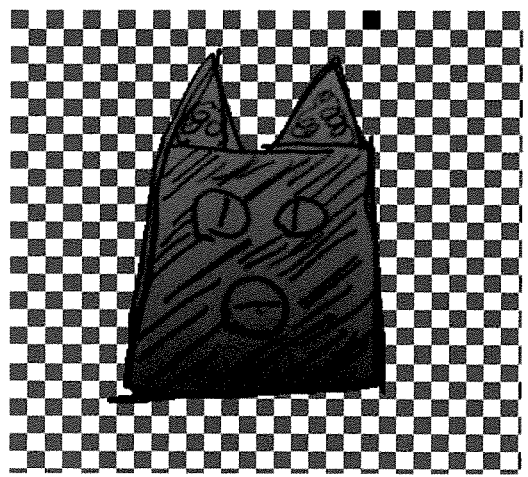
FIG. 10B is a diagram showing an image cut out using the cut-out mask image.

When image segmentation processing (Step S8 in FIG. 3) is performed using the cut-out mask image created as described above, a cut-out image (an image of the drawing portion) such as that shown in FIG. 10B is acquired. Note that the checkered pattern in FIG. 10B is a pattern conceptually showing a transparent area that is an area other than the area of the cut-out image, which does not actually exist. The cut-out image (an image of the drawing portion) acquired as described above is an image showing only the drawing P including line drawing portions therewithin. This cut-out image can be used in many arbitrary ways. For example, it may be combined with another image.

As described above, in the present embodiment, before performing predetermined image segmentation processing for segmenting the pixels of a whole image into foreground pixels and background pixels based on the positional information of some of the background pixels specified in the image, the control section 1 determines luminance for the background pixels based on luminance distribution in the image, and designates pixels having luminance equivalent to the determined luminance as background pixels so as to perform the image segmentation processing. As a result of this configuration, an area in an image can be precisely cut out therefrom without a user's auxiliary operation for specifying the area. That is, for example, even when luminance difference and brightness unevenness have occurred over a whole captured image showing a drawing handwritten on a piece of white paper or a white board by use of a black pen due to reflection at the time of the image capturing, the area of the drawing can be precisely identified and appropriately cut out.

Also, the control section 1 segments an image into a plurality of areas; determines luminance for background pixels for each of these areas based on luminance distribution in each area; and designates, for each area, pixels having luminance equivalent to the determined luminance as background pixels so as to perform image segmentation processing. As a result of this configuration, even when there are slight luminance differences over a whole image, the area of a drawing therein can be precisely identified and cut out.

Moreover, in a luminance value histogram, the control section 1 designates not the luminance values of the highest luminance areas (glossy reflection areas that are too bright) but luminance values close to the peak (the most luminance values in the distribution) as the luminance of background pixels. As a result of this configuration, glossy reflection areas that are too bright are not designated as backgrounds at first, and the pixels thereof are regarded as pixels that remain undetermined as to whether they are foregrounds or backgrounds so as to perform image segmentation processing, whereby the area of a drawing in the image can be cut out more precisely.

Furthermore, an original image to be processed in the present embodiment is a captured image showing a line drawing drawn using a second color on a drawing medium of a first color. When designating this line drawing portion as a foreground, the control section 1 designates areas of a color similar to the first color as a background. As a result of this configuration, when a drawing (a line drawing portion) drawn using a second color (black) on a drawing medium of a first color (white) is to be a foreground in a captured image, areas of a color similar to the first color can be designated as a background, whereby the area of the drawing can be cut out more precisely.

Still further, after image segmentation processing, when the area of background pixels are surrounded by the area of foreground pixels which is a line drawing portion, the control section 1 sets, as an area to be cut out, an area along the outermost contour of the area of the foreground pixels. As a result of this configuration, parts drawn within a drawing can remain without being cut out.

Yet still further, in the image segmentation processing of the present embodiment, initially designated background pixels are taken as pixels already determined to be backgrounds, and target pixels that remain undetermined as to whether they are foregrounds or backgrounds are determined to be foregrounds or backgrounds such that a total value acquired by luminance differences between adjacent pixels in plural areas of the image being tallied from a predetermined viewpoint is small. As a result of this configuration, target pixels that remain undetermined as to whether they are foregrounds or backgrounds can be determined to be foregrounds or backgrounds based on a luminance difference between adjacent pixels, whereby the area of a drawing in the image can be cut out more precisely.

Yet still further, based on pixel value histograms for a target image to be segmented into a foreground and a background, the control section 1 determines pixel values for some of the background pixels (a pixel value determination section). Then, the control section 1 determines pixels having pixel values equivalent to the pixel values for some of the background pixels in the target image, as some of the background pixels (a first determination section), and determines other background pixels and foreground pixels in the target image by use of the pixel value of each pixel in the target image and the positional information of some of the background pixels (a second determination section). As a result of this configuration, an area in an image can be precisely cut out therefrom without a user's auxiliary operation for specifying the area.

Yet still further, the control section 1 segments a target image, which is segmented into a foreground and a background, into a plurality of areas (segmentation section); determines pixel values for some of the background pixels for each of these areas based on a pixel value histogram for each area; determines some of the background pixels for each area based on the pixel values for some of the background pixels determined for each area; and determines the background pixels and the foreground pixels of the whole target image by use of the positional information of some of the background pixels determined for each area. As a result of this configuration, for example, even when luminance difference and brightness unevenness have occurred over a whole image due to reflection at the time of the image capturing, the area of a drawing in the image can be precisely identified and appropriately cut out.

In the above-described embodiment, the original image is a still image. However, it may be a moving image. In this case, the processing for cutting out an area may be performed for each frame or at predetermined frame intervals.

Also, in the above-described embodiment, the original image is equally segmented into 16 areas. However, the number of the segmentation may be automatically determined based on the contents of the original image, or be arbitrarily set by a user operation.

Moreover, in the above-described embodiment, an area corresponding to a blank portion of paper or a white board in an image is designated as a background, and an area corresponding to a drawing is designated as a foreground. However, these expressions "background" and "foreground" are expressions for descriptive purposes. In a case where an image is segmented into the area of drawing A and the area of drawing B, one may be regarded as "background pixels" and the other may be regarded as "foreground pixels". Also, an image to be cut out in the present embodiment is not limited to a drawing (a line drawing portion), and may be a photographic subject.

Furthermore, in the above-described embodiment, the segmentation method called Grab Cut is used as the predetermined image segmentation processing. However, other segmentation methods may also be used.

Still further, in the above-described embodiment, the moving image processing is performed in which a photographic subject (marathon runner) is extracted as a foreground from each frame image of a moving image where the photographic subject is a marathon runner, and combined with another moving image. However, processing may be performed in which a photographic subject is cut out as a foreground, and the portion from which the photographic subject has been cut out is covered with a background.

While the present invention has been described with reference to the preferred embodiments, it is intended that the invention be not limited by any of the details of the description therein but includes all the embodiments which fall within the scope of the appended claims.

What is claimed is:

1. An image processing device comprising:
   a pixel value determining section which determines pixel values of background pixels of a target image to be segmented into a foreground and a background;
   a first determination section which determines pixels of the target image having pixel values equivalent to the pixel values of the background pixels, as a portion of the background pixels; and
   a second determination section which repeatedly performs processing in which other background pixels and foreground pixels of the target image are determined by use of a pixel value of each pixel in the target image and positional information of the portion of the background pixels, and the background pixels and the foreground pixels of the target image are estimated with a predetermined accuracy, and the background pixels and the foreground pixels of the target image are determined with a higher accuracy by use of an estimated estimation result.

2. An image processing device comprising:
   a segmentation section which segments a target image to be segmented into a foreground and a background into a plurality of areas;
   a pixel value determining section which determines pixel values of background pixels for each area of the plurality of areas acquired by segmentation by the segmentation section;
   a first determination section which determines pixels for each area having pixel values equivalent to the pixel values of the background pixels determined for the each area, as a portion of the background pixels; and
   a second determination section which determines other background pixels and foreground pixels for the each area by use of a pixel value of each pixel for the each area and positional information of the portion of the background pixels, and determines the background pixels and the foreground pixels of the whole target image.

3. The image processing device according to claim 1, wherein the pixel value determining section determines most pixel values in distribution as the pixel values of the background pixels.

4. The image processing device according to claim 1, wherein the pixel value determining section determines luminance of the background pixels based on a luminance histogram of the target image to be segmented into a foreground and a background, and
    wherein the first determination section determines pixels of the target image having luminance equivalent to the luminance of the background pixels, as the portion of the background pixels.

5. The image processing device according to claim 1, wherein the target image is a captured image showing a line drawing portion drawn using a second color on a drawing medium of a first color, and
    wherein the pixel value determining section determines pixel values corresponding to the first color as the pixel values of the background pixels when the line drawing portion is to be a foreground.

6. An image processing device comprising:
    a pixel value determining section which determines pixel values of background pixels of a target image to be segmented into a foreground and a background;
    a first determination section which determines pixels of the target image having pixel values equivalent to the pixel values of the background pixels, as a portion of the background pixels;
    a second determination section which determines other background pixels and foreground pixels of the target image by use of a pixel value of each pixel in the target image and positional information of the portion of the background pixels; and
    a cut-out area setting section which sets an area along outermost contour of area of the foreground pixels as an area to be cut out in the target image, when area of the background pixels are surrounded by the area of the foreground pixels, after the background pixels and the foreground pixels are determined by the second determination section.

7. An image processing device comprising:
    a pixel value determining section which determines pixel values of background pixels of a target image to be segmented into a foreground and a background;
    a first determination section which determines pixels of the target image having pixel values equivalent to the pixel values of the background pixels, as a portion of the background pixels; and
    a second determination section which determines other background pixels and foreground pixels of the target image by use of a pixel value of each pixel in the target image and positional information of the portion of the background pixels, and takes initially designated background pixels as pixels already determined to be backgrounds, and determines target pixels that remain undetermined as to whether the target pixels are foregrounds or backgrounds to be foregrounds or backgrounds such that a total value acquired by luminance differences between adjacent pixels in plural areas of the target image being tallied from a predetermined viewpoint is small.

8. An image processing method comprising:
    a step of determining pixel values of background pixels of a target image to be segmented into a foreground and a background;
    a step of determining pixels of the target image having pixel values equivalent to the pixel values of the background pixels, as a portion of the background pixels;
    a step of determining other background pixels and foreground pixels in the target image by use of a pixel value of each pixel in the target image and positional information of the portion of the background pixels; and
    a step of repeatedly performing processing in which the background pixels and the foreground pixels of the target image are estimated with a predetermined accuracy, and the background pixels and the foreground pixels of the target image are determined with a higher accuracy by use of an estimated estimation result.

9. A non-transitory non-volatile storage medium readable by a computer of an image processing device and having stored thereon a program that is executable by the computer, the program being executable by the computer to perform functions comprising:
    processing for determining pixel values of background pixels of a target image to be segmented into a foreground and a background;
    processing for determining pixels of the target image having pixel values equivalent to the pixel values of the background pixels, as a portion of the background pixels;
    processing for determining other background pixels and foreground pixels in the target image by use of a pixel value of each pixel in the target image and positional information of the portion of the background pixels; and
    processing for repeatedly performing processing in which other background pixels and foreground pixels of the target image are determined by use of a pixel value of each pixel in the target image and positional information of the portion of the background pixels, and the background pixels and the foreground pixels of the target image are estimated with a predetermined accuracy, and the background pixels and the foreground pixels of the target image are determined with a higher accuracy by use of an estimated estimation result.

10. The image processing device according to claim 1, wherein the pixel value determining section determines pixel values of the background pixels based on a pixel value histogram of the target image to be segmented into a foreground and a background.

11. The image processing device according to claim 2, wherein determines pixel values of the background pixels for the each area of the plurality of areas acquired by segmentation by the segmentation section based on a pixel value histogram for each area.

12. The image processing device according to claim 2, wherein the pixel value determining section determines most pixel values in distribution as the pixel values of the background pixels.

13. The image processing device according to claim 2, wherein the pixel value determining section determines luminance of the background pixels based on a luminance histogram of the target image to be segmented into a foreground and a background, and
    wherein the first determination section determines pixels of the target image having luminance equivalent to the luminance of the background pixels, as the portion of the background pixels.

14. The image processing device according to claim 2, wherein the target image is a captured image showing a line drawing portion drawn using a second color on a drawing medium of a first color, and
    wherein the pixel value determining section determines pixel values corresponding to the first color as the pixel values of the background pixels when the line drawing portion is to be a foreground.

15. The image processing device according to claim 6, wherein the pixel value determining section determines pixel values of the background pixels based on a pixel value histogram of the target image to be segmented into a foreground and a background.

16. The image processing device according to claim 6, wherein the pixel value determining section determines most pixel values in distribution as the pixel values of the background pixels.

17. The image processing device according to claim 6, wherein the pixel value determining section determines luminance of the background pixels based on a luminance histogram of the target image to be segmented into a foreground and a background, and
wherein the first determination section determines pixels of the target image having luminance equivalent to the luminance of the background pixels, as the portion of the background pixels.

18. The image processing device according to claim 6, wherein the target image is a captured image showing a line drawing portion drawn using a second color on a drawing medium of a first color, and
wherein the pixel value determining section determines pixel values corresponding to the first color as the pixel values of the background pixels when the line drawing portion is to be a foreground.

19. The image processing device according to claim 18, wherein a cut-out area setting section sets an area along outermost contour of area of the foreground pixels as an area to be cut out in the target image, when area of the background pixels are surrounded by the area of the foreground pixels which is the line drawing portion, after the background pixels and the foreground pixels are determined by the second determination section.

20. The image processing device according to claim 7, wherein the pixel value determining section determines pixel values of the background pixels based on a pixel value histogram of the target image to be segmented into a foreground and a background.

21. The image processing device according to claim 7, wherein the pixel value determining section determines most pixel values in distribution as the pixel values of the background pixels.

22. The image processing device according to claim 7, wherein the pixel value determining section determines luminance of the background pixels based on a luminance histogram of the target image to be segmented into a foreground and a background, and
wherein the first determination section determines pixels of the target image having luminance equivalent to the luminance of the background pixels, as the portion of the background pixels.

23. The image processing device according to claim 7, wherein the target image is a captured image showing a line drawing portion drawn using a second color on a drawing medium of a first color, and
wherein the pixel value determining section determines pixel values corresponding to the first color as the pixel values of the background pixels when the line drawing portion is to be a foreground.

* * * * *